United States Patent
Georgin et al.

(10) Patent No.: US 11,407,397 B2
(45) Date of Patent: Aug. 9, 2022

(54) BRAKE TEMPERATURE AND TURNAROUND TIME ESTIMATION SYSTEMS AND METHODS

(71) Applicant: GOODRICH CORPORATION, Charlotte, NC (US)

(72) Inventors: Marc Georgin, Dayton, OH (US); Tyler Arsenault, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 328 days.

(21) Appl. No.: 16/597,617

(22) Filed: Oct. 9, 2019

(65) Prior Publication Data

US 2021/0107441 A1 Apr. 15, 2021

(51) Int. Cl.
  *B60T 17/22* (2006.01)
  *B64F 5/60* (2017.01)
  *B60T 5/00* (2006.01)
  *B60W 10/184* (2012.01)
  *F16D 65/847* (2006.01)
  *F16D 65/78* (2006.01)

(52) U.S. Cl.
  CPC .............. *B60T 17/221* (2013.01); *B60T 5/00* (2013.01); *B60W 10/184* (2013.01); *B64F 5/60* (2017.01); *F16D 65/847* (2013.01); *B60W 2510/184* (2013.01); *F16D 2065/783* (2013.01)

(58) Field of Classification Search
  CPC .................................................... B60T 17/221
  See application file for complete search history.

(56) References Cited

U.S. PATENT DOCUMENTS

| 8,151,944 | B2 | 4/2012 | Waltz |
| 9,004,241 | B2 * | 4/2015 | Browne .................... B60T 5/00 188/264 A |
| 9,096,204 | B2 * | 8/2015 | Cahill ..................... F16D 66/00 |
| 9,180,855 | B2 | 11/2015 | Georgin |
| 9,576,567 | B2 * | 2/2017 | Moser .................... H04R 1/342 |
| 9,718,447 | B2 * | 8/2017 | Waltz ........................ B60T 5/00 |
| 10,124,782 | B2 | 11/2018 | Georgin et al. |
| 10,197,124 | B2 * | 2/2019 | Bill ......................... H02P 29/60 |
| 10,336,473 | B2 | 7/2019 | Bill |
| 10,578,176 | B2 * | 3/2020 | Grazebrook .......... F16D 65/853 |
| 10,597,148 | B2 * | 3/2020 | Meinel Cheesman .. B64C 25/42 |
| 10,723,331 | B2 * | 7/2020 | Bill ........................ B60T 8/1703 |
| 10,935,093 | B2 * | 3/2021 | Hosamane ........... B64D 13/006 |
| 2013/0112805 | A1 | 5/2013 | Cox |
| 2015/0224974 | A1 | 8/2015 | Georgin |
| 2018/0370504 | A1 | 12/2018 | Bill et al. |
| 2019/0112037 | A1 | 4/2019 | Meinel Cheesman |
| 2019/0301554 | A1 | 10/2019 | Hosamane et al. |
| 2021/0107441 | A1 * | 4/2021 | Georgin ................ F16D 65/847 |

FOREIGN PATENT DOCUMENTS

| EP | 2743534 | 6/2014 |
| EP | 2772428 | 9/2014 |

OTHER PUBLICATIONS

European Patent Office, European Search Report dated Mar. 19, 2020 in Application No. 19216260.0.

* cited by examiner

*Primary Examiner* — Michael A Berns
(74) *Attorney, Agent, or Firm* — Snell & Wilmer L.L.P.

(57) ABSTRACT

A method for cooling a brake system is disclosed. In various embodiments, the method includes determining a turnaround time parameter; determining a time to cool parameter; determining a parameter difference between the time to cool parameter and the turnaround time parameter; and adjusting a flow of air directed at the brake system based on the parameter difference.

19 Claims, 6 Drawing Sheets

BRAKE TEMPERATURE AND TURNAROUND TIME ESTIMATION SYSTEMS AND METHODS

FIELD

The present disclosure relates to aircraft wheel and brake systems and, more particularly, to systems and methods for monitoring and controlling the temperature and turnaround time for brake systems following a brake activation.

BACKGROUND

Aircraft typically utilize brake systems on wheels to slow or stop the aircraft during landings, taxiing and emergency situations, such as, for example, a rejected takeoff (RTO), which generally refers to engagement of a brake system during an aborted takeoff and involves high braking loads over a short time period, resulting in a rapid increase in the brake temperature. The brake systems generally employ a heat sink comprising a series of friction disks, sandwiched between a pressure plate and an end plate, that may be forced into sliding contact with one another during a brake application to slow or stop the aircraft. Under various conditions, such brake applications may generate high temperatures and frictional loads throughout the heat sink and particularly on the surfaces of the stators and rotors and the pressure plate and the end plate that comprise the heat sink.

During a typical landing scenario, temperatures within the components of the heat sink may reach temperatures well above 1,000° F. (≈578° C.). Because the temperatures are so high, it is preferable to allow sufficient time for the brake components to cool to a dispatch temperature prior to attempting a subsequent takeoff. Allowing the components to cool to the dispatch temperature enables proper functioning of the brakes in the event of a rejected takeoff and avoids damage to the brakes that might otherwise occur during a brake application at temperatures above the dispatch temperature. Conversely, if the brakes are allowed to cool below the dispatch temperature, unnecessary wear of the rotors and stators may result during a brake application occurring during normal taxiing. While waiting a period of time following a landing alleviates the above concerns, specifying a fixed period of time between a landing and a subsequent takeoff may result in either too much or too little time on the ground, as the brakes may cool to below or remain above the dispatch temperature at the expiration of the fixed period of time.

Brake temperature monitoring systems may be employed to monitor aircraft brake temperatures following a landing. These systems typically include one or more temperature sensors (e.g., a thermocouple or an infrared sensor) disposed near or within each brake and a controller operatively coupled to the temperature sensors. Temperature data, as measured by the temperature sensors, is communicated to the controller which, in turn, processes the temperature data (e.g., by filtering, averaging or scaling the data) and outputs the data to, for example, a display device on the flight deck. Conventional brake temperature monitoring systems typically provide a temperature output and predictions of wait times based on the initial or current temperature, but do not account for a desired turnaround time that takes into account the dispatch temperature and environmental effects on the cooling of brake systems following a landing.

SUMMARY

A method for cooling a brake system is disclosed. In various embodiments, the method includes determining a turnaround time parameter; determining a time to cool parameter; determining a parameter difference between the time to cool parameter and the turnaround time parameter; and adjusting a flow of air directed at the brake system based on the parameter difference.

In various embodiments, adjusting the flow of air includes determining an error between the time to cool parameter and the turnaround time parameter. In various embodiments, adjusting the flow of air includes adjusting a fan speed in response to the error. In various embodiments, adjusting the flow of air includes increasing the fan speed if the error is greater than zero and decreasing the fan speed if the error is less than zero.

In various embodiments, determining the time to cool parameter includes determining a remaining time for the brake system to cool to a reference temperature. In various embodiments, the reference temperature is a dispatch temperature. In various embodiments, determining the turnaround time parameter includes determining an initial turnaround time. In various embodiments, determining the turnaround time parameter includes subtracting an elapsed time from the initial turnaround time. In various embodiments, the initial turnaround time is either a manually entered value or a default value.

In various embodiments, adjusting the flow of air is performed periodically at a rate equal to a predetermined time step. In various embodiments, the turnaround time parameter and the time to cool parameter are updated at each time step. In various embodiments, adjusting the flow of air is configured to equilibrate a brake system temperature with a reference temperature at an expiration of an initial turnaround parameter.

A brake system is disclosed. In various embodiments, the brake system includes a brake heat sink; a temperature sensor coupled to the brake heat sink; and a brake control unit configured to: determine a turnaround time parameter and a time to cool parameter, determine a parameter difference between the time to cool parameter and the turnaround time parameter, and adjust a flow of air directed at the brake system based on the parameter difference.

In various embodiments, a fan is configured to direct the flow of air at the brake system. In various embodiments, the fan is a variable speed fan. In various embodiments, the brake control unit is configured to determine an error between the time to cool parameter and the turnaround time parameter. In various embodiments, the brake control unit is configured to increase the flow of air if the error is greater than zero or decrease the flow of air if the error is less than zero. In various embodiments, the brake control unit is configured to adjust the flow of air periodically at a rate equal to a predetermined time step. In various embodiments, the brake control unit is configured to update the turnaround time parameter and the time to cool parameter at the rate equal to the predetermined time step.

A method for cooling a brake system is disclosed. In various embodiments, the method includes receiving a brake system temperature; determining a turnaround time parameter; determining a time to cool parameter based on the brake system temperature and a reference temperature; determining a parameter difference between the time to cool parameter and the turnaround time parameter; and adjusting a flow of air directed at the brake system based on the parameter difference, such that the brake system temperature will equal the reference temperature upon an expiration of the turnaround time parameter.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of elucidation and not of limitation. Furthermore, any reference to the singular includes plural embodiments, and any reference to more than one component or step may include a singular embodiment or step. Likewise, references to "a," "an" or "the" may include one item or more than one item and such reference to an item in the singular may also include the item in the plural. Also, any reference to attached, fixed, connected, or the like may include permanent, removable, temporary, partial, full or any other possible attachment option. Additionally, any reference to without contact (or similar phrases) may also include reduced contact or minimal contact. As used herein, "distal" refers to a direction outward, or generally away, from a reference component and "proximal" or "proximate" refer to a direction inward, or generally, towards the reference component. All ranges may include upper and lower values and all ranges and ratio limits disclosed herein may be combined. Further, the term "about" is intended to include a degree of error associated with measurement of a particular quantity based upon equipment or techniques otherwise available at the time of filing the application. For example, "about" may include a range of ±5% or 2% of a given value.

Figure 1A:
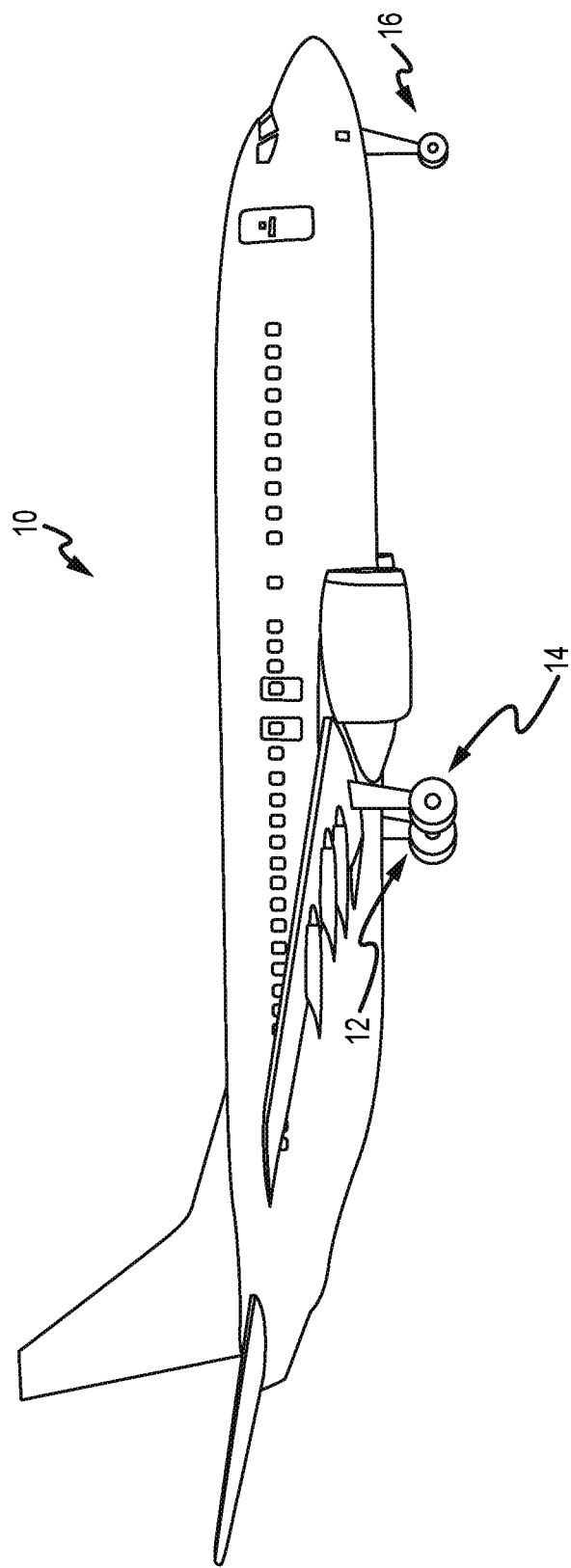
FIG. 1A illustrates an exemplary aircraft having a brake system, in accordance with various embodiments.
Figure 1B:
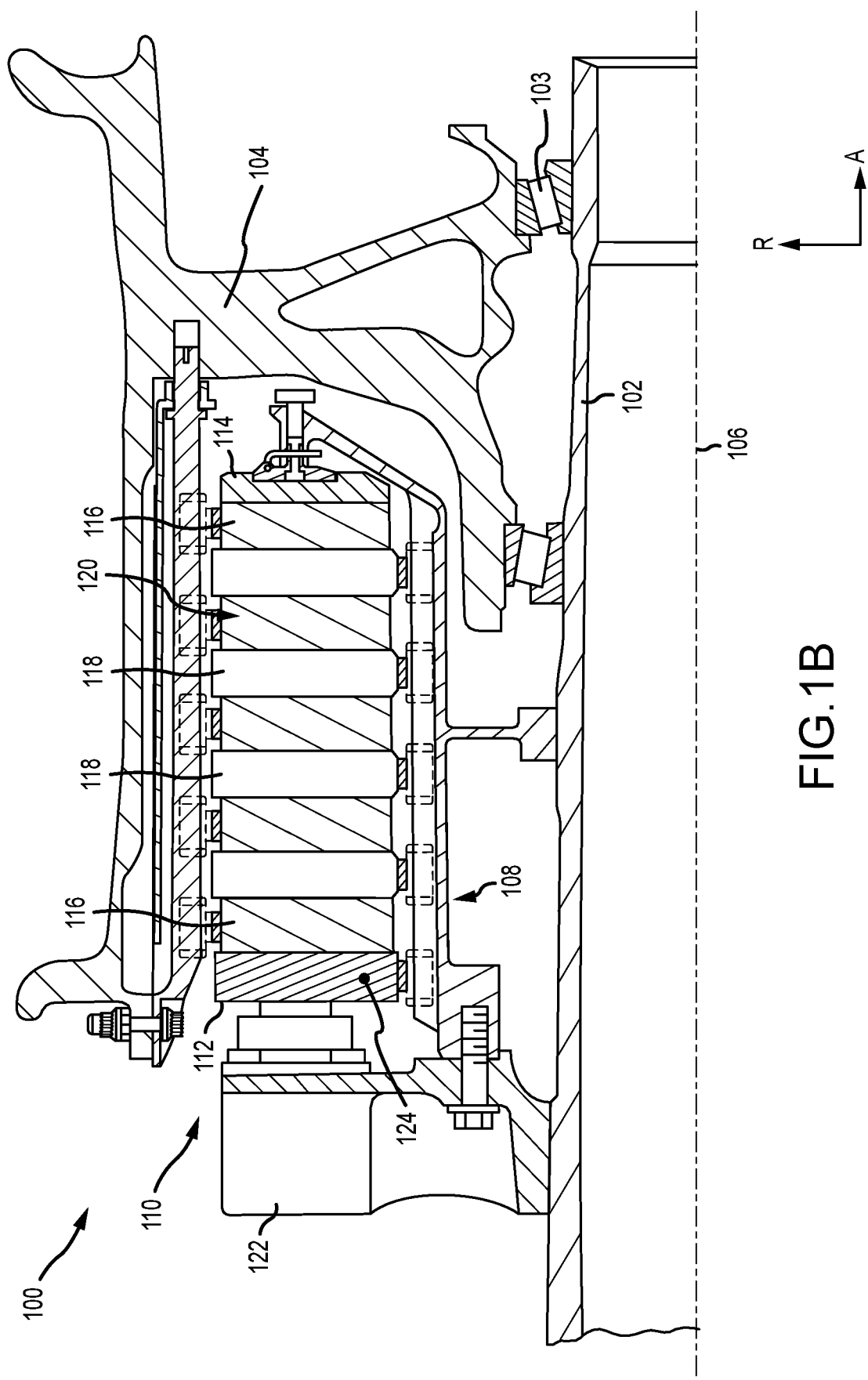
FIG. 1B illustrates a cross-sectional view of a brake mechanism, in accordance with various embodiments.

Referring now to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just described, the disclosure nevertheless contemplates any number of landing gear configurations. Referring now to FIG. 1B, there is schematically depicted a brake mechanism 100 configured for use on a landing gear, such as, for example, each of the left main landing gear 12 and the right main landing gear 14 described above with reference to FIG. 1A. In various embodiments, the brake mechanism is mounted on an axle 102 for use with a wheel 104 disposed on and configured to rotate about the axle 102 via one or more bearing assemblies 103. A central axis 106 extends through the axle 102 and defines a center of rotation of the wheel 104. A torque plate barrel 108 (sometimes referred to as a torque tube or barrel or a torque plate) is aligned concentrically with the central axis 106, and the wheel 104 is rotatable relative to the torque plate barrel 108.

The brake mechanism 100 includes a piston assembly 110, a pressure plate 112 disposed adjacent the piston assembly 110, an end plate 114 positioned a distal location from the piston assembly 110, and a plurality of rotor disks 116 interleaved with a plurality of stator disks 118 positioned intermediate the pressure plate 112 and the end plate 114. The pressure plate 112, the plurality of rotor disks 116, the plurality of stator disks 118 and the end plate 114 together form a brake heat sink or brake stack 120. The pressure plate 112, the end plate 114 and the plurality of stator disks 118 are mounted to the torque plate barrel 108 and remain rotationally stationary relative to the axle 102. The plurality of rotor disks 116 is mounted to the wheel 104 and rotate with respect to each of the pressure plate 112, the end plate 114 and the plurality of stator disks 118.

An actuating mechanism for the brake mechanism 100 includes a plurality of piston assemblies, including the piston assembly 110, circumferentially spaced around a piston housing 122 (only one piston assembly is illustrated in FIG. 1B). Upon actuation, the plurality of piston assemblies affects a braking action by urging the pressure plate 112 and the plurality of stator disks 118 into frictional engagement with the plurality of rotor disks 116 and against the end plate 114. Through compression of the plurality of rotor disks 116 and the plurality of stator disks 118 between the pressure plate 112 and the end plate 114, the resulting frictional contact slows or stops or otherwise prevents rotation of the wheel 104. In various embodiments, the plurality of rotor disks 116 and the plurality of stator disks 118 are fabricated from various materials, such as, for example, ceramic matrix composite materials, that enable the brake disks to withstand and dissipate the heat generated during and following a braking action. The brake mechanism 100 may also include a temperature sensor 124 (or several temperature sensors). In various embodiments, for example, the temperature sensor 124 may be disposed within or on a surface of the pressure plate 112 or within or on a surface of the torque plate barrel 108. The temperature sensor 124 may be configured to provide a signal representative of the temperature occurring within the brake stack 120 or within specific components of the brake mechanism 100.

Figure 2:
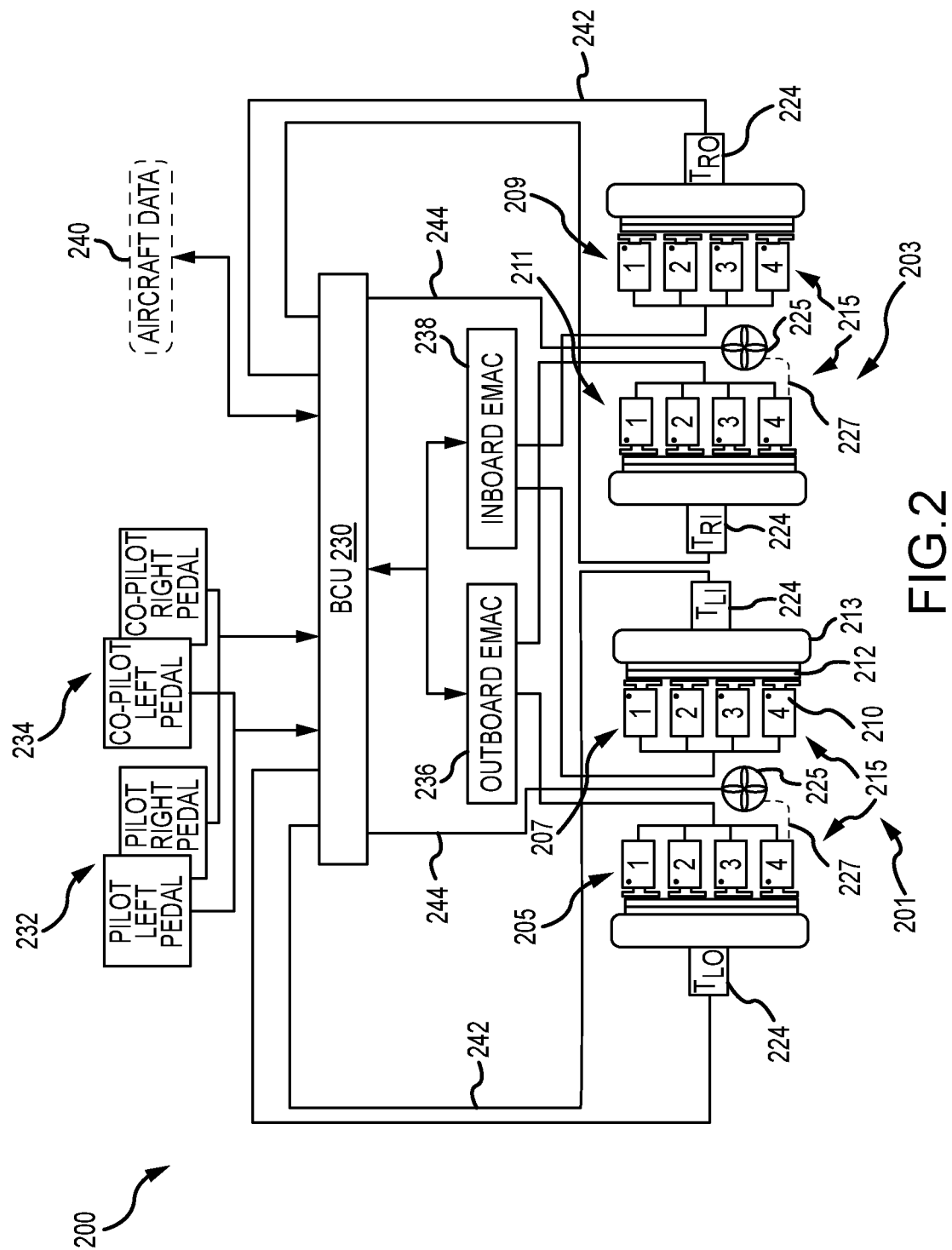
FIG. 2 illustrates a schematic view of a brake system, in accordance with various embodiments.

Referring now to FIG. 2, a schematic view of a brake system 200 is provided, in accordance with various embodiments. The brake system 200 includes a plurality of landing gear, such as, for example, a left main landing gear 201 and a right main landing gear 203. The left main landing gear 201 includes a left outboard brake mechanism 205 (LO) and a left inboard brake mechanism 207 (LI). Similarly, the right main landing gear 203 includes a right outboard brake mechanism 209 (RO) and a right inboard brake mechanism 211 (RI). One or more tires 213 may be included with each of the left main landing gear 201 and the right main landing gear 203. While left and right orientations for the landing gear and brake mechanisms are described above, the same components may be referred to as a first landing gear and a second landing gear, each having a first brake mechanism and a second brake mechanism, without loss of generality. In various embodiments, each of the left outboard brake mechanism 205, the left inboard brake mechanism 207, the right outboard brake mechanism 209 and the right inboard brake mechanism 211 includes a plurality of actuators 215 (labeled #1, #2, #3 and #4), each of which includes a piston assembly 210 configured to apply a load against a pressure plate 212, similar to, for example, the piston assembly 110 and the pressure plate 112 described above with reference to FIG. 1B. Further, each of the left outboard brake mechanism 205, the left inboard brake mechanism 207, the right outboard brake mechanism 209 and the right inboard brake mechanism 211 may include a temperature sensor 224, similar to the temperature sensor 124 described above with reference to FIG. 1B. In various embodiments, a fan 225 responsive to the temperature sensor 224, may be positioned proximate each brake mechanism, either as an on-board unit coupled to the corresponding landing gear via a mount 227 or as an external or auxiliary unit that airport personnel may position proximate the landing gear at a gate following landing.

In various embodiments, the brake system 200 is controlled by a brake control unit 230. The brake control unit (BCU) 230 is configured to receive various operator inputs, such as, for example, left and right pilot brake pedal signals from left and right pilot brake pedals 232 and left and right co-pilot brake pedal signals from left and right co-pilot brake pedals 234. In various embodiments, the BCU 230 is operatively coupled to one or more electro-mechanical actuator controllers (EMACs), including, for example, an outboard EMAC 236 and an inboard EMAC 238. In various embodiments, the outboard EMAC 236 is configured to receive brake force signals from the BCU 230 and control operation of the left outboard brake mechanism 205 and the right outboard brake mechanism 209, while the inboard EMAC 238 is configured to receive brake force signals from the BCU 230 and control operation of the left inboard brake mechanism 207 and the right inboard brake mechanism 211.

In various embodiments, the BCU 230 may receive other aircraft data 240, such as, for example, sensor data reflecting the temperatures of the brake mechanisms or of specific components within the brake mechanisms. For example, in various embodiments, the temperature sensor 224 associated with each brake mechanism is electrically coupled to the BCU 230 via one or more data buses 242. In such fashion, the BCU 230 may be configured to monitor temperature data received from the left main landing gear 202 and the right main landing gear 204, including, for example, temperature data associated with one or more of the components within each of the left outboard brake mechanism 205, the left inboard brake mechanism 207, the right outboard brake mechanism 209 and the right inboard brake mechanism 211. As described below, the temperature data received from the various brake mechanisms may be analyzed and used, with other data, including environmental data (e.g., wind speed and ambient temperature), to calculate a turnaround time for an aircraft following a brake application, such as, for example, a brake application that occurs during a landing. In various embodiments, the turnaround time may be influenced (e.g., shortened or lengthened) via operation of the fan 225 associated with each brake mechanism, with each such fan being connected to and controlled by the BCU 230 via one or more control buses 244.

Figure 3A:
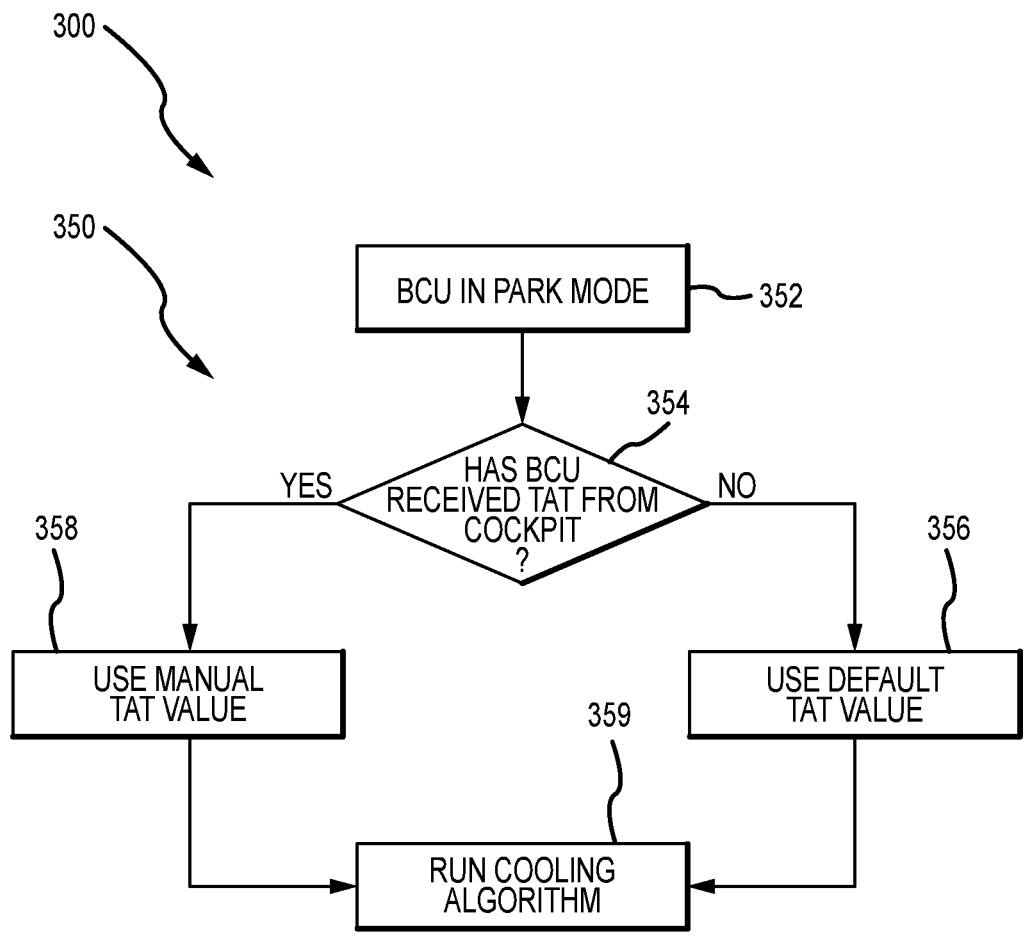
FIG. 3A illustrates a flow chart for cooling a brake system, in accordance with various embodiments.
Figure 3B:
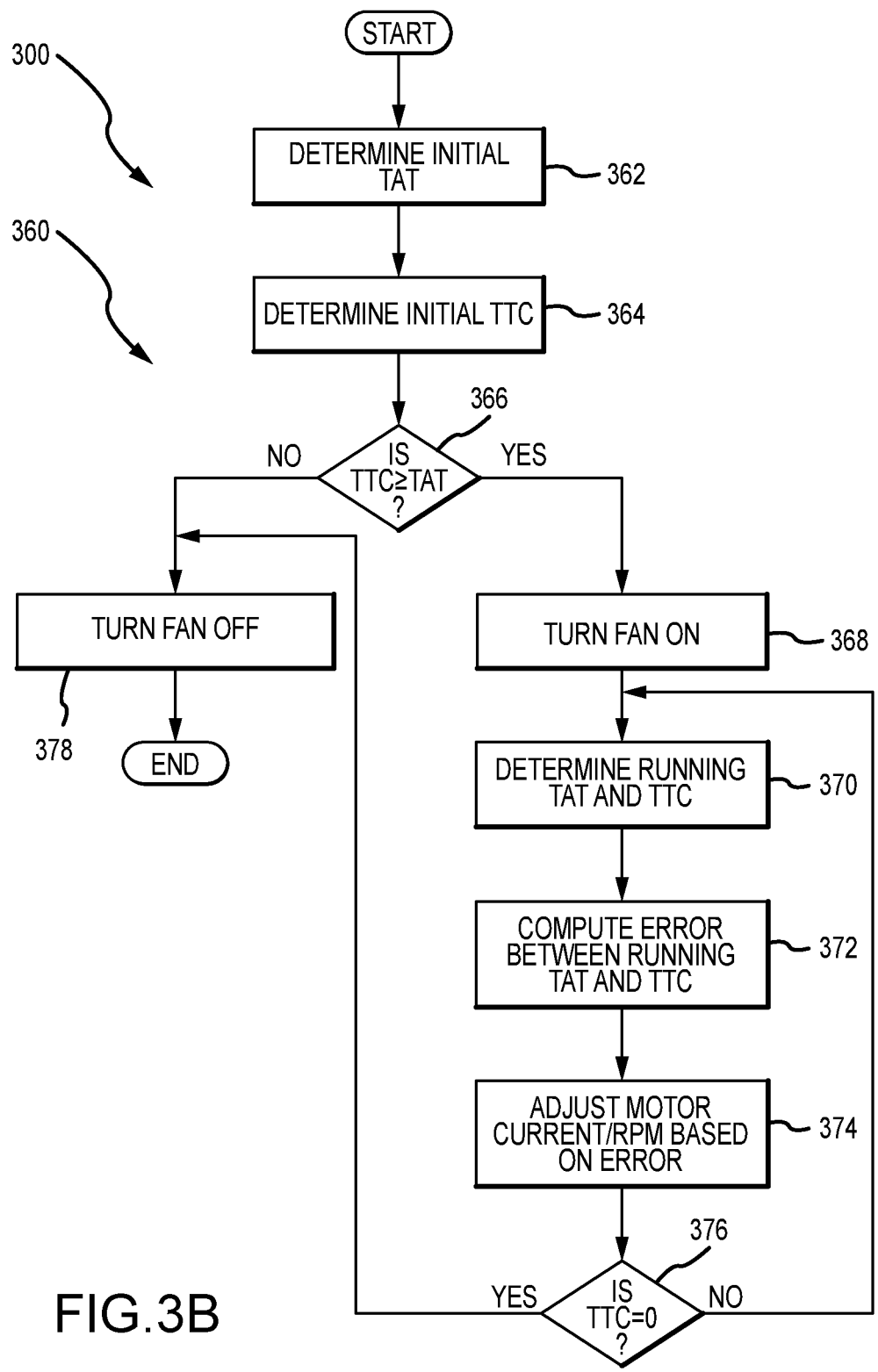
FIG. 3B illustrates a flow chart for cooling a brake system, in accordance with various embodiments.

Referring now to FIGS. 3A and 3B, two flow charts describing operation of a method 300 for controlling brake temperature and turnaround time are provided. Referring to FIG. 3A, for example, an initialization algorithm 350 is employed to initiate a turnaround time (TAT), which is either a manually entered value (e.g., entered by a pilot in the cockpit) or a default value, prior to running a cooling algorithm. More specifically, following landing of an aircraft and taxiing to a gate, the aircraft is parked and the BCU of the aircraft is placed into park mode at a first initialization step 352. At a second initialization step 354, a query is performed to determine whether the turnaround time used in the cooling algorithm is the manually entered value or the default value. For example, upon commencement of the initialization algorithm 350, the pilot may be afforded an initialization period of time (e.g., one hundred seconds) within which to provide the manually entered value for turnaround time. Following the expiration of the initialization period of time, the initialization algorithm 350 enters the second initialization step 354. If the pilot has not manually entered a turnaround time, then an initial turnaround time, $TAT_0$, is set using the default value (e.g., thirty-five minutes or one hour, etc.) at a third initialization step 356. If, on the other hand, the pilot has manually entered a turnaround time, then the initial turnaround time, $TAT_0$, is set using the manually entered value at a fourth initialization step 358. Once the initial turnaround time $TAT_0$ has been set, the method 300 exits the initialization algorithm 350 at a sixth step 359 and commences running the cooling algorithm 360 (see FIG. 3B).

Referring now to FIG. 3B, the cooling algorithm 360 is depicted as including several steps with one result being to operate a variable speed fan (e.g., the fan 225 described above with reference to FIG. 2) at speeds configured to optimize a rate of cooling of the brakes, such that, when possible, the brakes reach a dispatch temperature, $T_D$, at the expiration of the initial turnaround time, $TAT_0$ (or an initial turnaround parameter). For example, following commencement of the cooling algorithm 360, the BCU periodically computes a running turnaround time, TAT(t) (or a turnaround time parameter that is reflective of the turnaround time), which may be defined as $TAT(t)=TAT_{0-t}$, where t is the elapsed time (or an elapsed time parameter) following commencement of the cooling algorithm 360. The running turnaround time, TAT(t), is then compared with a time representative of the currently remaining time to cool to the dispatch temperature, TTC(t) (or a time to cool parameter that is reflective of the time to cool or the time remaining to cool to the dispatch temperature), to determine a time difference (or a parameter difference indicative of the time difference). If TTC(t) is greater than TAT(t), then the fan may be directed to increase the flow of air at the brake system in order to increase the rate of cooling. Conversely, if TTC(t) is less than TAT(t), then the fan may be directed to decrease or turn off the flow of air at the brake system in order to decrease the rate of cooling. In various embodiments, increasing or decreasing the flow of air may refer to altering the flow velocity of the air or the flow direction of the air or even the temperature of the air in order to affect the rate of cooling of the brake system. As described below, the process is repeated at a predetermined rate (e.g., at a predetermined time step), such that the flow of air is repeatedly changed, as necessary, in order for the brake system to cool to $T_D$ at the desired $TAT_0$. The running turnaround time, TAT(t), is determined at a first step 362 of the cooling algorithm 360 and, at t=0, takes the value of the initial turnaround time, $TAT_0$.

At a second step 364 of the cooling algorithm 360, the BCU determines an initial value for the time to cool, TTC(t), which represents the time remaining to cool the brakes to the dispatch temperature at t=0. In various embodiments, determining values for the time to cool involves solving one or more differential equations that account for heat losses due to radiation, convection and conduction. Approximations for the time to cool with specific application to brake systems have been derived and are described, for example, in U.S. Pat. Nos. 9,180,855 and 10,124,782, each of which is assigned to Goodrich Corp. and incorporated in its entirety herein by reference. One such approximation provides relations for calculating the time to cool as follows, assuming TTC(t) is estimated periodically at a fixed time step, P:

$$TTC(t) = \frac{1}{\alpha(t)} \ln\left(\frac{T_D - T_{ADJ}}{T(t-P) - T_{ADJ}}\right) - P$$

$$\alpha(t) = \ln\left(\frac{T(t) - T_{ADJ}}{T(t-P) - T_{ADJ}}\right)$$

where t is the current elapsed time following t=0, T(t) is the temperature of the brake system at time t (or the brake system temperature or current brake system temperature), T(t−P) is the temperature of the brake system at the previous time step (t−P), $T_D$ is the dispatch temperature, $T_{ADJ}$ is a temperature tuning parameter specific to a brake system or assembly, and α(t) represents a temperature decay coefficient. In various embodiments, $T_{ADJ}$ takes on a value between 0° F. (≈−17.7° C.) and $T_D$ or, in various embodiments, between 85° F. and 120° F. (≈30° C. and ≈49° C.). TTC(t) thus represents, at time t, the estimated time remaining to cool the brake assembly to the dispatch temperature $T_D$. In various embodiments, one or more of the initial temperature $T_0$, the dispatch temperature $T_D$ and the ambient temperature $T_{amb}$ may be referred to as a reference temperature with which to compare the brake system temperature T(t) during the cooling process.

Following calculation of the time to cool, TTC(t), and the turnaround time, TAT(t), the values are compared at a third step 366 to determine whether TTC(t) is greater than or equal to TAT(t). If TTC(t) is greater than or equal to TAT(t), then a fan (or a plurality of fans) directed at the brakes is turned on at a fourth step 368; if, on the other hand, TTC(t) is less than TAT(t), the process terminates without the fan being turned on. At a fifth step 370, current values for TTC(t) and TAT(t) are computed and, at a sixth step 372, an error, e(t), between TTC(t) and TAT(t) is determined. In various embodiments, the error, e(t), may represent a normalized difference between the values of TTC(t) and TAT(t)—e.g., e(t)=(TTC(t)−TAT(t))/$T_D$. At a seventh step 374, the error is used to adjust the speed, ω, of the fan, depending on the difference between TTC(t) and TAT(t). For example, if TTC(t) remains greater than TAT(t) upon entry into the sixth step 372, then the speed of the fan is increased over its current speed. More specifically, if, at step n, the error, e(t), is greater than zero, then the speed of the fan is increased, such that $\omega_n$ is greater than $\omega_{n-1}$. Similarly, if, at step n, TTC(t) is less than TAT(t), or e(t) is less than zero, then the speed of the fan is decreased, such that $\omega_n$ is less than $\omega_{n-1}$. If, at step n, the error e(t) is equal to zero, then the speed of the fan remains the same, such that $\omega_n$ is equal to $\omega_{n-1}$. This process repeats at each time step until TTC(t) becomes equal to zero at an eight step 376. Once TTC(t) becomes equal to zero, the process terminates at a ninth step 378, where the fan is turned off.

Calculation of the error, e(t) and adjustment of the fan speed based thereon may be carried out in a variety of ways, including, for example, via a proportional-integral-derivative controller (PID controller). In determining the fan speed, other factors may be taken into account, such as, for example, the magnitude of the temperature difference, ΔT, between T(t) and a reference temperature, such as, for example, the dispatch temperature $T_D$ or the ambient temperature $T_{amb}$. If ΔT exceeds a first temperature difference threshold, $T_1$, for example, then the fan(s) may be set at a first fan speed, $S_1$, that corresponds with the first temperature difference threshold being exceeded. If, on the other hand, ΔT is less than the first temperature difference threshold, the fan(s) may be set at a second fan speed $S_2$ that corresponds with the first temperature difference threshold not being exceeded, where $S_2 < S_1$. While the two speeds, $S_1$ and $S_2$, and a single temperature difference threshold, $T_1$, are described above, it will be appreciated that several temperature difference thresholds, e.g., a second temperature difference threshold, $T_2$, and a third temperature difference threshold, $T_3$, may be defined as well, where $T_1 > T_2 > T_3$. In such case, the first fan speed, $S_1$, is applied where ΔT exceeds $T_1$, the second fan speed, $S_2$, is applied where $T_1 \geq \Delta T > T_2$, and the third fan speed, $S_3$, is applied where $T_2 \geq \Delta T > T_3$. Additional temperature difference thresholds and fan speeds may be implemented to smooth the transition between the fan speeds.

Figure 4:
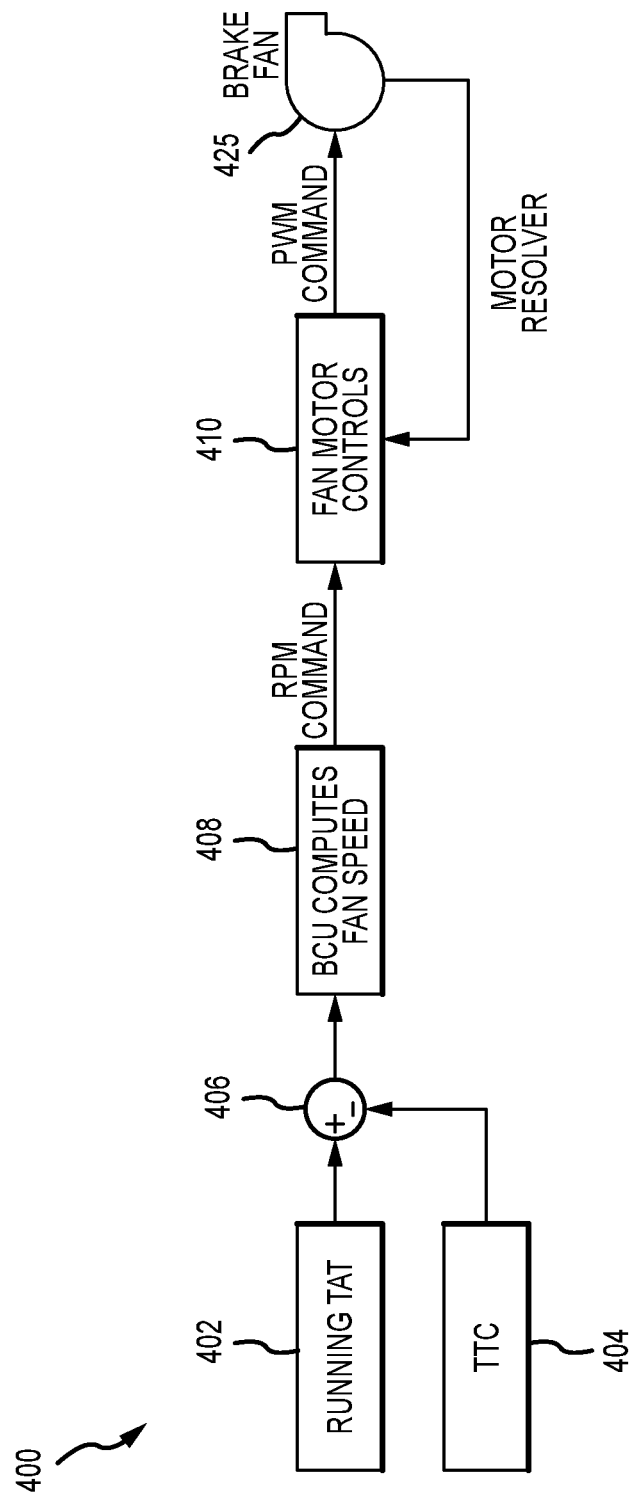
FIG. 4 illustrates a schematic view of a brake temperature control system, in accordance with various embodiments.

Referring now to FIG. 4, a system 400 for cooling brakes is illustrated, in accordance with various embodiments. The system 400 includes a first processor 402 for computing TAT(t) and a second processor 404 for computing TTC(t). While the system 400 is described as having the first processor 402 and the second processor 404, it will be appreciated that both processors may comprise a single processor, such as, for example, a BCU as described above with reference to FIGS. 2 and 3A and 3B. In various embodiments, the system 400 further includes a comparator 406 (or a subtractor) that determines whether TTC(t) is greater than or less than TAT(t). In various embodiments, the comparator 406 may comprise a controller configured to generate an error value as described above with reference to FIG. 3B. The result of the comparator 406 is then used to determine the fan speed in a speed setting block 408. In various embodiments, the controller 408 may comprise a PID controller or similar controller configured to generate the fan speed command. As described above, this step may also be performed by a processor or the BCU and is carried out in much the same manner as described above for the cooling algorithm 360. Stated otherwise, in various embodiments, one or both of the comparator 406 and the speed setting block 408 may be part of or performed within the BCU. A speed output of the speed setting block 408 is then used by a fan control block 410 to set the speed of a fan 425, which, in various embodiments, may be similar to the fan 225 described above with reference to FIG. 2. Once the speed of the fan 425 is set, system logic may return to the first processor 402 and the second processor 404 to repeat the process (which is comparable to the cooling algorithm 360 returning to the fifth step 370 in FIG. 3B). Note that in both the system 400 and the cooling algorithm 360 described above, the time t is typically discretized by a time step or time period, P, such that $t = t_n = n*P$, where P is an arbitrary constant that may depend on the type of brake or the maximum temperature of the brake following a landing. Typically, P is set between, for example, ten seconds and one-hundred twenty seconds, or between fifteen seconds and ninety seconds, or between thirty second and sixty seconds.

In such manner, determinations of TAT(t) and TTC(t) and the related calculations are performed periodically, such as, for example, at every thirty or sixty seconds.

The foregoing systems and methods provide increased brake life by ensuring the temperature of a brake system (particularly the brake heat sink) has cooled to a dispatch temperature that is sufficient to safely perform a rejected takeoff maneuver. Sufficient cooling ensures the brake system will not experience overheating during an RTO maneuver due to the brake system remaining at an unacceptably high temperature following a normal brake application during a landing. In addition, the systems and methods provide increased life by ensuring, when possible, the temperature of the brake system does not overcool during the cooling period following a landing and prior to a subsequent takeoff. Overcooling (e.g., cooling to ambient temperature) of the brake system may lead to excess wear of the brake heat sink when applied during taxiing because of increased carbon wear experienced at cooler temperatures. Finally, the systems and methods described herein increase brake life by controlling the rate of cooling following a landing. Specifically, as the rate of cooling is slowed, less oxidation occurs at the surface of the friction disks of the brake heat sink, which results in reduced loss of carbon at the surfaces, either during the cooling process or brake applications during normal taxiing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for cooling a brake system, comprising:
    determining a turnaround time parameter TAT(t);
    determining a time to cool parameter TTC(t);
    determining a parameter difference between the time to cool parameter and the turnaround time parameter; and
    adjusting a flow of air directed at the brake system based on the parameter difference.

2. The method of claim 1, wherein adjusting the flow of air includes determining an error e(t) between the time to cool parameter and the turnaround time parameter, wherein a dispatch temperature is $T_D$ and the error e(t)=(TTC(t) TAT(t))/$T_D$.

3. The method of claim 2, wherein adjusting the flow of air includes increasing a fan speed if the error e(t) is greater than zero and decreasing the fan speed if the error e(t) is less than zero.

4. The method of claim 1, wherein determining the time to cool parameter includes determining a remaining time for the brake system to cool to a reference temperature.

5. The method of claim 4, wherein the reference temperature is a dispatch temperature.

6. The method of claim 5, wherein determining the turnaround time parameter includes determining an initial turnaround time $TAT_0$.

7. The method of claim 6, wherein determining the turnaround time parameter includes subtracting an elapsed time from the initial turnaround time such that $TAT(t) = TAT0-t$.

8. The method of claim 7, wherein the initial turnaround time is either a manually entered value or a default value.

9. The method of claim 1, wherein adjusting the flow of air is performed periodically at a rate equal to a predetermined time step.

10. The method of claim 9, wherein the turnaround time parameter and the time to cool parameter are updated at the rate equal to the predetermined time step.

11. The method of claim 10, wherein the adjusting the flow of air is configured to equilibrate a brake system temperature with a reference temperature at an expiration of an initial turnaround parameter.

12. A brake system, comprising:
a brake heat sink;
a temperature sensor coupled to the brake heat sink; and
a brake controller configured to:
determine a turnaround time parameter and a time to cool parameter;
determine a parameter difference between the time to cool parameter and the turnaround time parameter; and
adjust a flow of air directed at the brake system based on the parameter difference.

13. The brake system of claim 12, further comprising a fan configured to direct the flow of air at the brake system.

14. The brake system of claim 13, wherein the fan is a variable speed fan.

15. The brake system of claim 14, wherein the brake controller is configured to determine an error between the time to cool parameter and the turnaround time parameter.

16. The brake system of claim 15, wherein the brake controller is configured to increase the flow of air if the error is greater than zero or decrease the flow of air if the error is less than zero.

17. The brake system of claim 16, wherein the brake controller is configured to adjust the flow of air periodically at a rate equal to a predetermined time step.

18. The brake system of claim 17, wherein the brake controller is configured to update the turnaround time parameter and the time to cool parameter at the rate equal to the predetermined time step.

19. A method for cooling a brake system, comprising:
receiving a brake system temperature;
determining a turnaround time parameter;
determining a time to cool parameter based on the brake system temperature and a reference temperature;
determining a parameter difference between the time to cool parameter and the turnaround time parameter; and
adjusting a flow of air directed at the brake system based on the parameter difference, such that the brake system temperature will equal the reference temperature upon an expiration of the turnaround time parameter.

\* \* \* \* \*